Jan. 25, 1927.
G. E. FENNER
1,615,747
ARTIFICIAL BAIT
Filed March 20, 1926
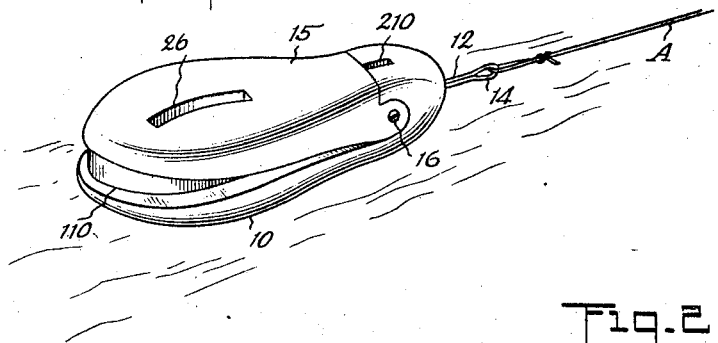
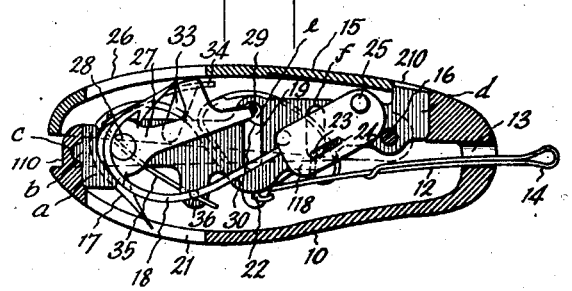
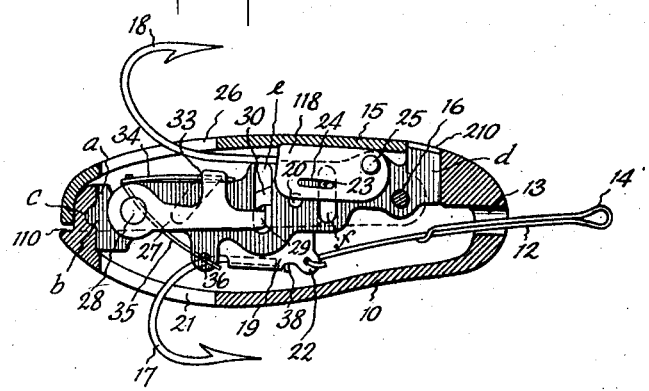
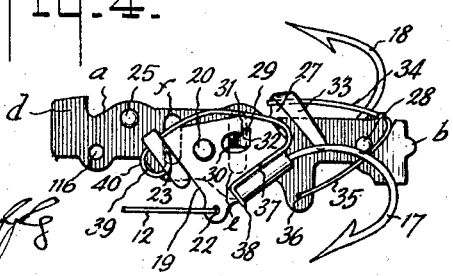
WITNESSES
INVENTOR
G.E. FENNER
BY
ATTORNEYS Patented Jan. 25, 1927.

1,615,747

UNITED STATES PATENT OFFICE.

GEORGE E. FENNER, OF OXFORD, WISCONSIN, ASSIGNOR OF ONE-FOURTH TO MARIAN ZIEGLER, ONE-EIGHTH TO JAMES E. WALL, ONE-EIGHTH TO WILLIAM H. BUSSE, ONE-EIGHTH TO JOHN R. GERRITTS, ALL OF OXFORD, WISCONSIN, AND ONE-EIGHTH TO ARTHUR A. MORGAN, OF WHITEWATER, WISCONSIN.

ARTIFICIAL BAIT.

Application filed March 20, 1926. Serial No. 96,278.

My invention relates to an artificial fishing bait and more particularly to a bait in which the hooks are ordinarily guarded and the barbs thereof housed but in which the hooks become exposed upon the bait being taken by a fish. The present invention is intended as an improvement on the fishing bait forming the subject matter of United States Letters Patent No. 1,466,616, granted to me August 28, 1923, and United States Letters Patent No. 1,571,776, granted to me on February 2, 1926.

The particular object of the present invention is to provide an artificial bait of the character indicated and improved with respect to the means for causing the hooks to penetrate the fish upon the bait being attacked.

A further important object of the invention is to provide a frame on which the hooks and their controlling and actuating means are mounted to be insertable and removable with the frame, as a unit.

Reference is to be had to the accompanying drawings forming a part of this specification, it being understood that the drawings are merely illustrative of one example of the invention.

Figure 1 is a perspective view of an artificial bait embodying my invention;

Figure 2 is a longitudinal vertical section thereof, the bait being shown with the hooks in the housed position;

Figure 3 is a view similar to Figure 2 but showing the housing sections collapsed and the hooks spread and exposed;

Figure 4 is an elevation of the frame with the hooks and other movable parts mounted on said frame.

In carrying out my invention in accordance with the illustrated example, the bait is formed with a body 10 cut away at the upper side. A short length of wire 12 extends through a hole 13 in the forward end of the body 10 and to the hollow interior of said body and is formed at the outer end with an eye 14 for the attachment of a fish line A. A housing section 15 is pivotally secured by a transverse fastener 16, preferably a screw, to the main body 10. Said section 15 and the said body are movable toward and from each other so that the housing may collapse at the rear end. The body 10 at said rear end has a rabbet 110 receiving the overlapping edge of the housing section 15 when the housing collapses.

In the present invention, the pair of hooks employed and the actuating and controlling means therefor making up the operative parts of the bait, are mounted on a frame securable in the body 10 of the bait. By employing a plate to mount the hooks and the various operative parts material advantages are obtained, as for example, the assembling and placing of the parts is facilitated as well as any necessary repairs and economy is thus promoted. Also, the one frame with its parts mounted thereon may be employed in housings of various shapes and styles. Also, the frame is thus removable as a unit with the hooks and the other movable parts.

Two hooks 17 and 18 are employed in the bait. One hook (17) has a flattened member 19 at the front end of the shank of the hook and at said flattened member, the hook 17 is pivotally secured to the body 10 by a transverse pin 20 so that the hook may swing through an opening 21 in the bottom of the body 10 near the rear end to assume a position with the barb projecting beyond the body or housed within the body 10 and its swingable section 15.

The frame supporting the hooks and other movable parts is indicated by the letter $a$ and extends from near the front to near the rear end of the body 10. At the rear end of the frame $a$ is a projection $b$ adapted to enter a recess $c$ in the body 10. At the front end of frame $a$ is an upwardly directed flattened portion $d$, the upper end of which is received in a slot 210 of body 10. The letters $e$, $f$, indicate vertical slots in the frame $a$.

The wire 12 or equivalent connecting medium for the fish line A is secured to the flattened member 19 of hook 17 as indicated at 22. The numeral 23 indicates the terminal pin formed on a spring 37 hereinafter referred to, said spring extending through the slot $f$ in frame $a$ and into a slot 24 in the flattened member 118 rigid with the hook 18 and pivoted as at 25 to frame $a$. The spring 37 functions to spread the hooks as hereinafter explained. The barbed end of the hook 18 is adapted to be projected through a slot 26 in movable housing section 15.

The device includes a lever 27 pivoted at its rear end as at 28 to the frame $a$ and disposed against a side thereof. The lever 27 is formed with a lateral pin 29 passing through the slot $e$ of frame $a$ and into an opening 30 in member 19 of hook 17. A notch 31 is complementary to the opening 30 and receives the terminal end 32 of pin 31. The lever 27 is formed also with a hook 33 bent downwardly to embrace the frame $a$. Said hook 33 receives one end of a bowed spring 34, the opposite end 35 of which extends beneath a stud 36 projecting laterally at a side of frame $a$. The tendency of spring 34 is by its upward pressure on hook 33 to rock the hook 17 in a direction to house the same and thereby through the connection between the hooks to house both hooks.

The spring 37 hereinbefore referred to is fastened at one end to flattened member 19 of hook 17 as at 38 and the opposite end passes beneath a hook 39 on said flattened member 19, said opposite end of spring 37 being given a loop form as at 40 and terminating in the pin 23 projecting into slot 24 of hook 18.

With the described assemblage of parts, when the fish takes the bait at the rear end, causing the housing section 15 to collapse to the position shown in Figure 3, initially the collapsing movement of housing section 15 depresses lever 27, the terminal end 32 of pin 29 being thus depressed out of the notch 31 so that the said pin 29 has free movement in the opening 30. This slight downward movement of lever 27 rocks downwardly the flattened member 19 and the hook 17 rigid therewith, to a slight extent sufficient to cause the pull on the fish line A and wire 12 to be effective on said flattened portion 19 and hook 17. Hence, the resistance of the fish and the pull on the line will cause the hook 17 to rock on its pivot 20. This throws down the lever 27 further and its hook 33 compresses the spring 34. At the same time the downward movement of the hook 17 and its flattened member 19 will cause the spring 37 through its terminal pin 23 to throw upwardly the hook 18 to the projected position beyond the slot 26. Thus both hooks are thrown outwardly and penetrate the mouth or gills of the fish. Reaction of the spring 34 will tend to restore the lever 27 and the housing section 15 to the positions shown in Figure 2 and the reaction of the spring 37 will aid in withdrawing the hooks 17, 18 within the housing. The numeral 116 indicates a transverse hole in the frame $a$ through which the pivot pin 16 of housing section 15 extends.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In an artificial bait, a housing comprising a body and a section pivoted to the body to collapse or expand the housing, a supporting frame, means to secure said frame within the housing, a pair of hooks adapted to be projected through the top and bottom of the housing or to assume positions within the housing, said hooks pivoted to said frame, a lever pivoted to said frame and adapted to be depressed with the collapsing of the pivoted housing section, means to restore said lever to a position with the housing section raised, spring means connected with both hooks and tending to maintain the hooks within the housing, and means connected with one of the hooks and adapted to be secured to a fish line.

2. In an artificial bait, a collapsible housing, a frame within said housing, a pair of hooks mounted on said frame, means also mounted on said frame and connected with one of said hooks so that said one hook is subject to the collapsing of the housing, a connection between said hooks so that a movement of one will constrain both to move for projecting the hooks beyond the housing or for withdrawing the hooks within the housing, and means to connect a fish line with one of said hooks so that a pull on the line will throw said hook outwardly and thereby cause the other hook of the pair to move outwardly.

3. In an artificial bait, a collapsible housing, a frame within said housing, a pair of hooks pivotally mounted in said housing and adapted to project beyond the same, a lever connected with one of said hooks and directly engageable by the collapsible housing to be moved by the collapsing movement, said lever adapted to be insertable and removable with said frame and hooks, as a unit, a spring connection between the hooks, means to connect one hook with a fish line and a spring on said frame engaging said lever and tending to throw the same to a position for moving the hook engaged therewith outwardly or inwardly.

GEORGE E. FENNER.